United States Patent [19]

Igarashi

[11] Patent Number: 5,119,238
[45] Date of Patent: Jun. 2, 1992

[54] OBJECTIVE LENS SYSTEM FOR ENDOSCOPES

[75] Inventor: Tsutomu Igarashi, Tokyo, Japan

[73] Assignee: Olympus Optical Co., Ltd., Tokyo, Japan

[21] Appl. No.: 596,501

[22] Filed: Oct. 12, 1990

[30] Foreign Application Priority Data

Oct. 13, 1989 [JP] Japan ................... 1-265056

[51] Int. Cl.$^5$ ............................. G02B 13/18
[52] U.S. Cl. ..................... 359/714; 359/715; 359/716; 359/740
[58] Field of Search .............. 350/469, 450, 432–435

[56] References Cited

U.S. PATENT DOCUMENTS

| | | | |
|---|---|---|---|
| 4,662,725 | 5/1987 | Nishioka | 350/432 |
| 4,674,844 | 6/1987 | Nishioka et al. | 350/469 |
| 4,806,001 | 2/1989 | Okabe et al. | 350/469 X |
| 4,867,546 | 9/1989 | Nishioka et al. | 350/432 |
| 4,976,522 | 12/1990 | Igarashi | 350/432 X |

FOREIGN PATENT DOCUMENTS 60-169818 9/1985 Japan.
61-162021 7/1986 Japan.

*Primary Examiner*—Scott J. Sugarman
*Attorney, Agent, or Firm*—Cushman, Darby & Cushman

[57] ABSTRACT

A nearly telecentric objective lens system for endoscopes comprising an aperture stop, and a lens unit which has a positive refractive power and is arranged after said aperture stop, wherein said aperture stop is located at the front focal point of said positive lens unit and a single aspherical surface or a plurality of aspherical surfaces are arranged only in said positive lens unit. Distortion is corrected favorably in the objective lens system for endoscopes.

14 Claims, 10 Drawing Sheets

OBJECTIVE LENS SYSTEM FOR ENDOSCOPES

BACKGROUND OF THE INVENTION a) Field of the Invention

The present invention relates to a nearly telecentric objective lens system for endoscopes, and more specifically to an objective lens system which is composed relatively compactly and so as to correct the negative distortion produced in general telecentric lens systems.

b) Description of the Prior Art

As is well known to those skilled in the art, objective lens systems to be used with fiber scopes, endoscopes and video scopes using single-plate color image pickup devices must be telecentric. Further, it is also known that distortion is aggravated as telecentric objective lens systems for endoscopes have wider angles.

When the entrance and exit pupils are imaged in a condition satisfying the sine condition, and free from spherical aberration, relationship between angle of incidence $\theta_1$ of the principal ray on the entrance pupil and distortion $D(\theta_1)$ can be expressed by the following formula (i) using magnification $\beta_E$ for the paraxial pupil as a parameter.

$$D(\theta_1) = 100 \times [\cos\theta_1/(\sqrt{1-\sin^2\theta_1/\beta E^2}) - 1] \quad (i)$$

In case of an objective lens system which is strictly telecentric, the magnification for the paraxial pupil has an infinitely large absolute value and the distortion therein is expressed by the following formula (ii), whereby negative distortion is produced:

$$D(\theta_1) = 100 \times [\cos\theta_1 - 1](\%) \quad (ii)$$

For designing an ordinary telecentric objective lens system, however, it is unnecessary to select the magnification $\beta_E$ for the paraxial pupil which strictly has an infinitely large absolute value, but the magnification must have an absolute value $|\beta_E|$ which is larger than 2. If $|\beta_E|$ is smaller than 2, the departure from the telecentric condition will be too large to use the objective lens system of interest with endoscopes.

Remarkable negative distortion is produced in objective lens systems which are more or less telecentric. There has been proposed a method to correct this distortion by changing the imaging condition of the pupils with an aspherical surface.

As the conventional examples of objective lens systems for endoscopes which adopt the retrofocus type composition for correcting curvature of field and use aspherical surfaces for correcting distortion, there are known the lens systems disclosed by U.S. Pat. No. 4662725 and U.S. Pat. No. 4867546.

The lens system disclosed by U.S. Pat. No. 4662725 uses, for correcting distortion, an aspherical surface only in the front lens unit which is arranged before a stop. However, the lens system which uses an aspherical surface only in the front lens unit has an outside diameter too large for image height therein as is clear from the embodiments described in the specification of this patent. It is considered that this defect can be attributed to a fact that the correction of the negative distortion with the aspherical surface arranged in the front lens unit produces remarkable adverse influence on the other aberrations, especially curvature of the meridional image surface. When the negative refractive power of the front lens unit is strengthened for preventing the outside diameter of the lens system from being enlarged, the curvature of meridional image surface and the aberrations other than the distortion are aggravated, thereby making the lens system practically usable.

In order to correct the defect of the lens system described above, the lens system disclosed by U.S. Pat. No. 4867546 uses an aspherical surface in each of a front lens unit arranged before a stop and a rear lens unit arranged after the stop for correcting distortion and curvature of field at the same time. Since this lens system is designed so as to correct the negative distortion by using the aspherical surface in the rear lens unit thereof in addition to the aspherical surface arranged in the front lens unit, and correct the influence on curvature of field produced by the use of the aspherical surfaces with the front lens unit and the rear lens unit, the lens system allows the lens units thereof to have powers stronger than those of the lens units arranged in the lens system disclosed by U.S. Pat. No. 4662725 and to be more compact. When the lens system disclosed by U.S. Pat. No. 4867546 is designed as a retrofocus type for correcting Petzval's sum, however, the aspherical surface used in the front lens unit produces an influence.

In a retrofocus type objective lens system for endoscopes, the lens component arranged on the most object side has a negative power, which is inevitably strengthened by designing the lens system more compact. According to the description made in the specification of U.S. Pat. No. 4867546, it is desirable that the aspherical surface used in the front lens unit is located close to the object point for correcting distortion. In other words, it is desirable that the lens component which is arranged on the most object side and has a strong negative power is designed as an aspherical lens component. In all the retrofocus type lens systems out of the embodiments of this conventional example, the negative lens components arranged on the most object side are designed as aspherical lens components. When the negative lens component arranged on the most object side has an aspherical surface, whether the surface is located on the object side or the image side, there is posed a problem described below.

When the surface located on the most object side is designed as an aspherical surface in an objective lens system, it will degrade the water drop-off characteristic required for endoscopes. The water drop-off characteristic means a property to prevent water, viscous liquid, etc. adhering to the lens surfaces in the distal ends of endoscopes from remaining on said surfaces, and is evaluated as a total function including air supply, water feeding and so on for washing the distal ends of endoscopes in the field of digestive organs in which endoscopes are used most widely. When the water drop-off characteristic is degraded, water remaining on the surface of the objective lens system cannot be removed by performing the air supply, water feeding, etc., thereby making it impossible to observe normally through endoscopes. A good water drop-off characteristic is therefore an important requirement for endoscopes.

When the negative lens component located on the most object side has an aspherical surface convex on the object side as in the case of the conventional example described above, the lens component has a high inclination at the outermost marginal portion thereof, and water and/or viscous liquids are apt to remain in the cavity around the boundary between the lens component and the fixing frame therefor. Further, the shape of said aspherical surface is designed so as to have curvature remarkably varied at the marginal portion thereof, and hinders smooth flows of air and water, thereby making it difficult to remove the water, etc. remaining on the marginal portion of the lens component. Accordingly, the objective lens system described as the conventional example can hardly be used with medical endoscopes on which viscous liquids, etc. adhere frequently to the lens surfaces.

When the negative lens component arranged on the most object side has an aspherical surface on the image side, it will be practically impossible to manufacture the lens component. In order to design the lens system of interest compact, the lens component to be arranged on the most object side must have a strongly negative power. A concave surface arranged at the foremost location in an objective lens system is undesirable for correction of distortion, allows foreign matters to be accumulated thereon and hinders the proper function of endoscopes. Accordingly, it is inevitably obliged to impart a strongly negative power to the image side surface of the negative lens component. When this concave surface having the strongly negative power is designed as an aspherical surface which has large departure from the reference sphere thereof to correct distortion, it will be difficult to manufacture this lens component with high precision by press molding. In order to prevent surface precision from being degraded by deformation at the stage of press molding, a body glass material to be manufactured into the aspherical lens component described above is generally shaped so as to have a spherical surface matched to a certain degree with the desired aspherical surface so that the deformation will be as little as possible at the stage of the press molding, eccentricity of stress distribution will be as little as possible between the molding die and the body glass material. However, when the aspherical surface has too large departure from the reference sphere thereof and has a concave shape remarkably varying thickness of the lens component, it will be impossible to distribute stress uniformly at the stage of the press molding. Accordingly, it will be difficult to manufacture the lens component having such an aspherical surface with high precision by the press molding even when the body material thereof is preliminarily shaped.

Though aspherical lens components can be manufactured by methods other than the press molding, these methods cannot provide high productivity, require high manufacturing costs, are applicable only to certain specific types of aspherical surfaces and are not generally usable. The aspherical lens components to be used in the objective lens system for endoscopes according to the present invention are deemed to be manufacturable only by the press molding.

SUMMARY OF THE INVENTION

A primary object of the present invention is to provide a nearly telecentric objective optical system which is relatively compact and has favorably corrected distortion.

Another object of the present invention is to provide an objective lens system for endoscopes which is capable of correcting curvature of field sufficiently.

The objective lens system for endoscopes according to the present invention is a nearly telecentric lens system which comprises an aperture stop, and a lens unit having a positive refractive power and arranged after the aperture stop, and uses at least one aspherical surface satisfying the following condition (1) in the lens unit having the positive refractive power:

(1) $E_i' (n_{i-1} - n_i) > 0$ wherein the reference symbol $E_i'$ represents the aspherical surface coefficient of the fourth order for said aspherical surface, and the reference symbols $n_{i-1}$ and $n_i$ designates the refractive indices of the media located on the object side and the image side respectively of said aspherical surface.

The objective lens system for endoscopes according to the present invention can comprise, in addition to the members described above, a lens unit which comprises a negative lens element and arranged on the object side of the aperture stop. It is desirable that the optical system having the lens unit comprising the negative lens element satisfies the following condition(2):

$$\omega \leq I/f \leq 0.9 \tan (\omega/0.9) \quad (2)$$

wherein the reference symbol $\omega$ represents the half field angle of the objective lens system, the reference symbol I designates the maximum image height and the reference symbol f denotes the focal length of the objective lens system.

Now, the objective lens system for endoscopes according to the present invention will be described detailedly below.

First, description will be made on the aspherical surface used in the objective lens system according to the present invention.

The aspherical surface used in the objective lens system according to the present invention has a shape expressed by the following formula (iii):

$$x = [y^2/r/1 + \sqrt{1 - p(y/r)^2}] + By^2 + Ey^4 + Fy^6 + Gy^8 + \ldots \quad (iii)$$

wherein the reference symbol x and y represent the abscissa and the ordinate respectively which are taken as the optical axis and the direction perpendicular thereto as shown in FIG. 21 wherein the direction toward the image is taken as positive, and the intersection between the surface and the optical axis is taken as the origin. Further, the reference symbol r designates the radius of curvature at the vertex of the quadratic surface, the reference symbol p denotes the conical constant, and the reference symbols B, E, F, G, . . . represent the aspherical surface coefficients of the second, fourth, sixth, eighth, . . . orders respectively. For description on correction of aberrations in the objective lens system according to the present invention, it is convenient to divide the formula (iii) of aspherical surface into the term expressing a spherical surface and those expressing an aspherical surface, and the following formula (iv) will be used for expressing the aspherical surface:

$$x = [y^2/r'/1 + \sqrt{1 - (y/r')^2}] + E'y^4 + F'y^6 + G'y^8 + \cdots \quad (iv)$$

wherein the reference symbol r' represents the radius of curvature on the reference sphere of the aspherical surface (a spherical surface in contact with the aspherical surface at the vertex thereof), and the reference symbols E', F', G', . . . designate the aspherical surface coefficients of the fourth, sixth, eighth, . . . orders respectively after the transformation.

When p=1 and B=0 in the formula (iii), it is unnecessary to transform it into the formula (iv), and E=E', F=F', G=G', ... and so on. In other cases, however, E≠E', F≠F', G≠G', ... and so on.

The composition of the objective lens system according to the present invention will be described below.

Objective lens systems for endoscopes are classified into two types: a high-grade type in which curvature of field is corrected sufficiently with a combination of the lens system and an image guide, number of picture elements in a solid-state image pickup device, etc., and a simple type in which curvature of field is not corrected sufficiently. In both the two types of objective lens systems, distortion must be corrected sufficiently. When distortion is corrected by arranging a lens unit (a front lens unit) before an aperture stop and using an aspherical surface in the front lens unit as in the case of the conventional objective lens system, however, there are posed the problems described above.

The objective lens system according to the present invention is adapted so as to correct distortion by arranging an aspherical surface only in the lens unit arranged after the aperture stop (the rear lens unit). The condition (1) is required when the location of the aspherical surface is restricted as described above.

Distortion $\Delta V_i$ and astigmatism $\Delta III_i$ to be produced by an aspherical surface can be expressed as follows by using the aspherical surface coefficient of the fourth order $E_i$:

$$\Delta V_i = 8 h_i \overline{h_i}^3 \cdot E_i'(n_{i-1} - n_i) \quad (v)$$

$$\Delta III_i = 8 h_i^2 \overline{h_i}^2 \cdot E_i'(n_{i-1} - n_i) \quad (vi)$$

wherein the reference symbols $h_i$ and $\overline{h_i}$ represent heights of the paraxial marginal ray and the paraxial principal ray respectively on the i'th surface, and the reference symbols $\Delta V_i$ and $\Delta III_i$ designate the distortion coefficient of the third order and the astigmatism of the third order respectively to be produced by the aspherical surface coefficient $E_i'$ of the fourth order.

And is seen from the above-mentioned formula (v) and (vi), $\Delta V_i$ and $\Delta III_i$ have signs reverse to each other in the front lens unit, but have the same sign in the rear lens unit from the relationship between the signs of $h_i$ and $\overline{h_i}$.

In a telecentric objective lens system for endoscopes, negative distortion is produced, and the rear lens unit thereof refracts, while maintaining a positive refractive power as a whole, the principal ray largely, thereby producing remarkable negative astigmatism. Accordingly, the negative astigmatism can be corrected simultaneously by correcting the distortion by using an aspherical surface in the rear lens unit.

In order to obtain $\Delta V_i > 0$ in the rear lens unit for correcting the negative distortion by using an aspherical surface in the rear lens unit, it is sufficient to design said aspherical surface so as to satisfy the above-mentioned condition (1).

The objective lens system according to the present invention can comprises a single or a plurality of aspherical surfaces in the rear lens unit thereof. However, the distortion cannot be corrected favorably without using at least one aspherical surface satisfying the condition (1).

Further from the viewpoint of correction degree of the distortion, it is desirable that a total sum $\Sigma E_i'(n_{i-1} - n_i)$ of $E_i'(n_{i-1} - n_i)$'s of the aspherical surfaces arranged in the rear lens unit satisfies the following condition (3):

$$\Sigma E_i'(n_{i-1} - n_i) \cdot f^3 > 0.001$$

If the above-mentioned condition (3) is not satisfied, the distortion will be corrected at too low a degree or cannot be corrected sufficiently.

Further, it is more desirable that the above-mentioned total sum satisfies the following condition (4):

$$\Sigma E_i'(n_{i-1} - n_i) \cdot f^3 > 0.01$$

Judging from the orders of heights of rays in the above-mentioned formula (v) and (vi) related to the aberration coefficients of aspherical surface, it is desirable for corrections of the distortion and astigmatism to locate the aspherical surface(s) at position(s) as which the marginal ray and the principal ray are not too low. When the heights, on the aspherical surface(s), of the marginal ray and the principal ray to attain to the maximum image height are represented by $h_m$ and $h_c$ respectively, the radius of the aperture stop is designated by $r_s$ and the maximum image height is denoted by I, it is desirable for favorably correcting the distortion and astigmatism to arrange the aspherical surface(s) at a location (or locations) satisfying the following conditions (5) and (6) at the same time:

$$|h_m/r_s| > 0.5 \quad (5)$$

$$|h_c/I| > 0.5 \quad (6)$$

If the aspherical surface(s) is (are) arranged at a location (or locations) which does (do) not satisfy the condition (5) or (6), it will be impossible to obtain a sufficient function to correct the aberrations even the aspherical surface(s) has (have) large departure from the reference sphere(s) thereof.

The location(s) satisfying the above-mentioned conditions is (are) on the image side of the lens component arranged nearest the aperture stop and not too close to the image point.

Further, the aspherical surface(s) should desirably be arranged on the surface(s) having positive refractive power(s). Since the objective lens system for endoscopes must have a wide field angle, the rear lens unit thereof must comprise surfaces which have strongly positive refractive powers and produce remarkable aberrations. Correction of aberrations in the objective lens system can be facilitated by designing these surfaces as aspherical surfaces so as to reduce the aberrations to be produced by these surfaces themselves. For this reason, paraxial powers of these aspherical surfaces $f(n_{i-1} - n_i)/r_i'$ should desirably be higher than a certain level and the aberrations can be corrected favorably while maintaining a sufficient power of the objective lens system as a whole when the paraxial power has a value larger than 0.1.

Moreover, in order to suppress production of coma to a level as low as possible, it is desirable to design surfaces convex on the image side as the aspherical surfaces.

The lens unit arranged after the aperture stop in the objective lens system according to the present invention can be composed of three lens components which may comprise a cemented doublet. It is especially desirable to compose the rear lens unit, in the order from the object side, of a positive lens component, a positive lens component whose image side surface has a positive refractive power and a positive lens component whose object side surface has a positive refractive power.

Since an objective lens system for endoscopes has a wide field angle even when it has a relatively simple composition, the lens unit arranged after the aperture stop must have a refractive power strong enough to largely refract the principal ray. For this reason, the offaxial aberrations are produced remarkably and can hardly be corrected even by using aspherical surfaces when this lens unit is composed of two lens components. When the lens unit is composed of four or more lens components, in contrast, the lens components will have shapes which can hardly be manufactured in practice due to the restriction imposed to the space available in the objective lens system.

Now, description will be made on an objective lens system having an additional lens unit which is arranged before the aperture stop and comprises a negative lens component (a front lens unit).

When the negative lens component is arranged before the aperture stop, the objective lens system becomes the retrofocus type in which curvature of field can be corrected easily. In this objective lens system, however, the front lens unit produces negative distortion. It is therefore desirable, when the front lens unit is composed of a single lens component, to bend the object side surface of the lens component so as to have a positive refractive power from the viewpoint of correction of the distortion, astigmatism and coma. It is desirable that the objective lens system comprising the front lens unit before the aperture stop satisfies the above-mentioned condition (2). The condition (2) is required for correcting the distortion more favorably while correcting curvature of field by arranging the lens unit comprising the negative lens component before the aperture stop.

The conventional telecentric objective lens systems for endoscopes generally have a distortion characteristic of $I = \sin \omega$. These objective lens systems therefore produce remarkable negative distortion. Even when this distortion is corrected, it cannot be said that the correction is substantially sufficient in a condition of $I/f \approx \sin \omega$. It is necessary to correct the distortion to a level satisfying $I/f \geq \omega$.

Lens systems such as photographic lens systems which are free from distortion generally satisfy a condition of $I/f \approx \tan \omega$. Therefore, correction of distortion to a level satisfying $I/f > 0.9 \tan (\omega/0.9)$ will pose a problem of positive distortion. For this reason, it is desirable that these lens systems satisfy the above-mentioned condition (2).

In order to correct the other aberrations favorably while correcting distortion to the level satisfying the condition (2) and maintain good manufacturability of the lens components, etc., it is necessary to select the composition described above.

The objective lens system according to the present invention can comprise a positive lens component, in addition to the negative lens component, in the front lens unit arranged before the aperture stop.

When the positive lens component is arranged in the front lens unit, it becomes possible to correct distortion also in the front lens unit by refracting the principal ray with the positive lens component. Therefore, the addition of the positive lens component permits enhancing correction level for the distortion in the objective lens system or, when distortion is to be corrected to the same level as that in the lens system which does not use the positive lens component in the front lens unit, lessening the burden of the aberration correcting function imposed on the aspherical surface(s), thereby improving manufacturability of the lens components arranged in the rear lens unit. When the positive lens component is arranged in the front lens unit, it is possible to use an aspherical surface also in the front lens unit. Since the aberration correcting function is not imposed only on this aspherical surface, the positive lens component serves for reducing departure from the reference sphere and improving manufacturability. In addition, the water drop-off characteristic can be improved by reducing inclination at the marginal portion of the lens component. The aspherical surface used in the front lens unit is preferable for correction of aberrations. It is therefore desirable to use an aspherical surface in the front lens unit since it serves to prevent degradation of manufacturability of the aspherical lens component and the water drop-off characteristic. As a result, the addition of the positive lens component in the front lens unit makes it possible to obtain an objective lens system having favorable performance either by arranging the aspherical surface(s) in the rear lens unit only or using an aspherical surface also in the front lens unit.

DETAILED DESCRIPTION OF THE PREFERRED EMBODIMENTS

Figure 1:
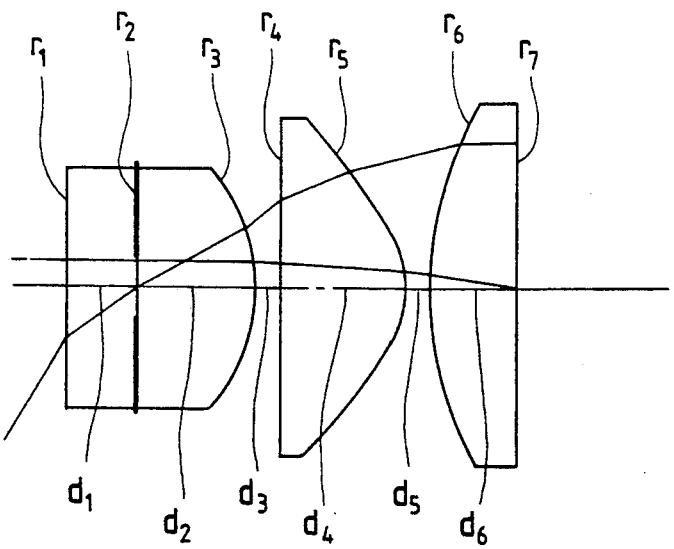
FIG. 1 through FIG. 10 show sectional views illustrating compositions of Embodiments 1 through 10 respectively of the objective lens system for endoscopes according to the present invention.
Figure 2:
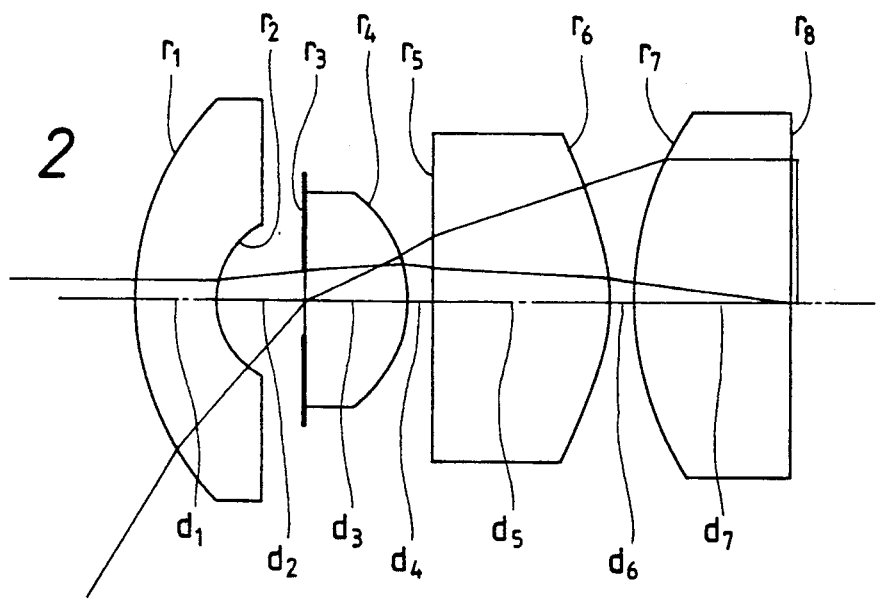
Figure 21:
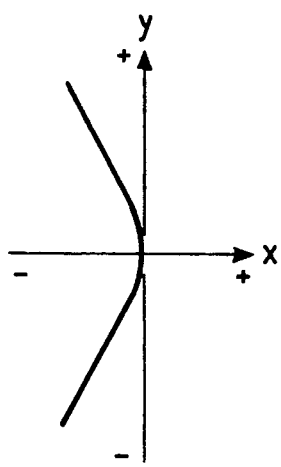
FIG. 21 shows a graph illustrating a system of coordinates for the formula of aspherical surface.
Figure 3:
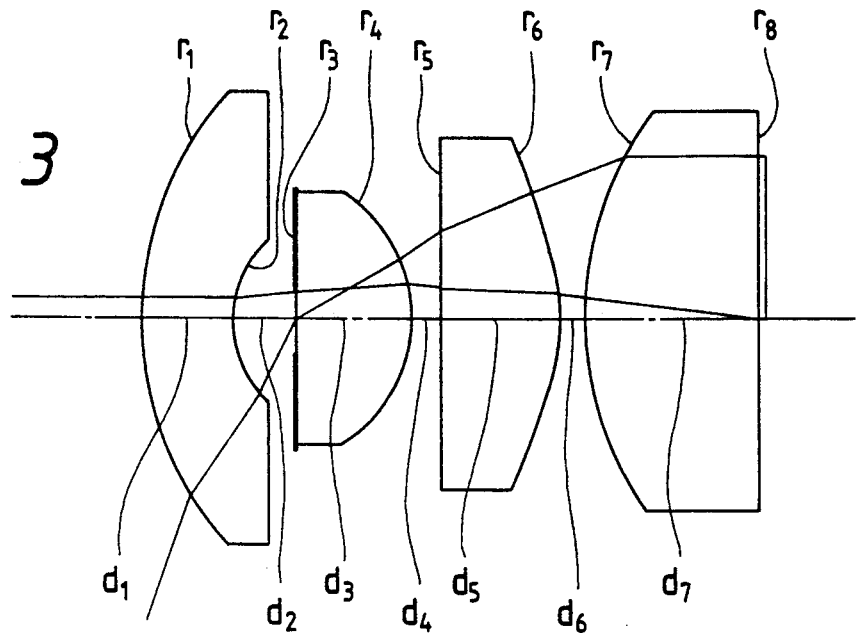
Figure 4:
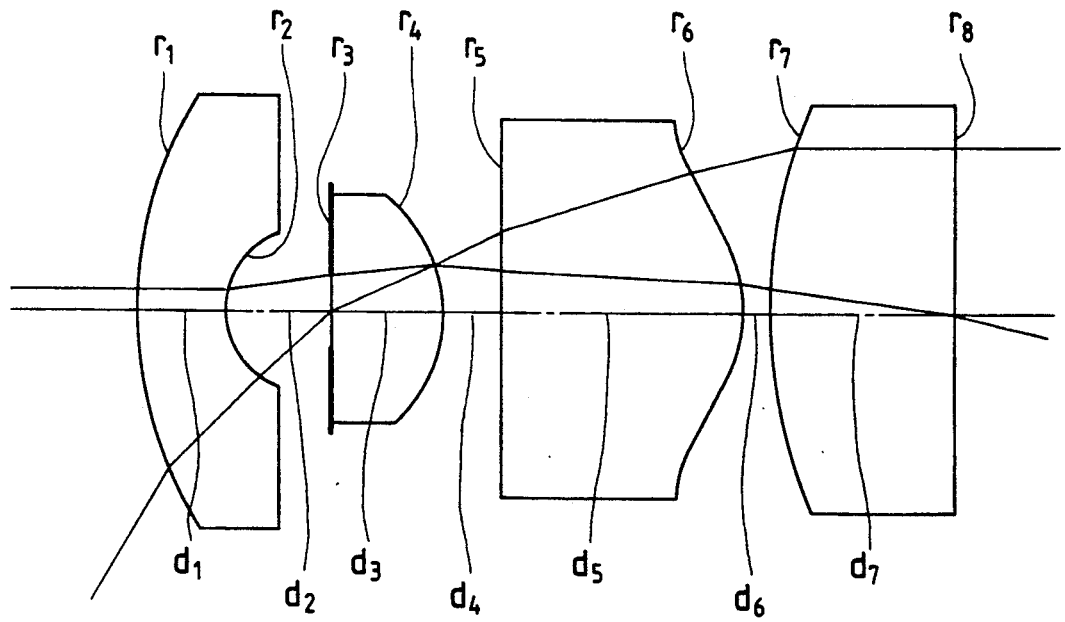
Figure 5:
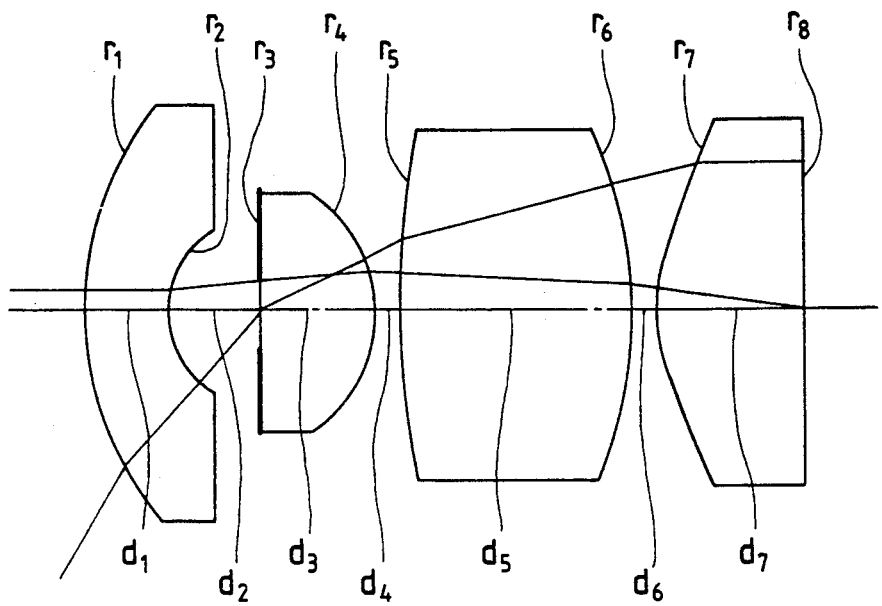
Figure 6:
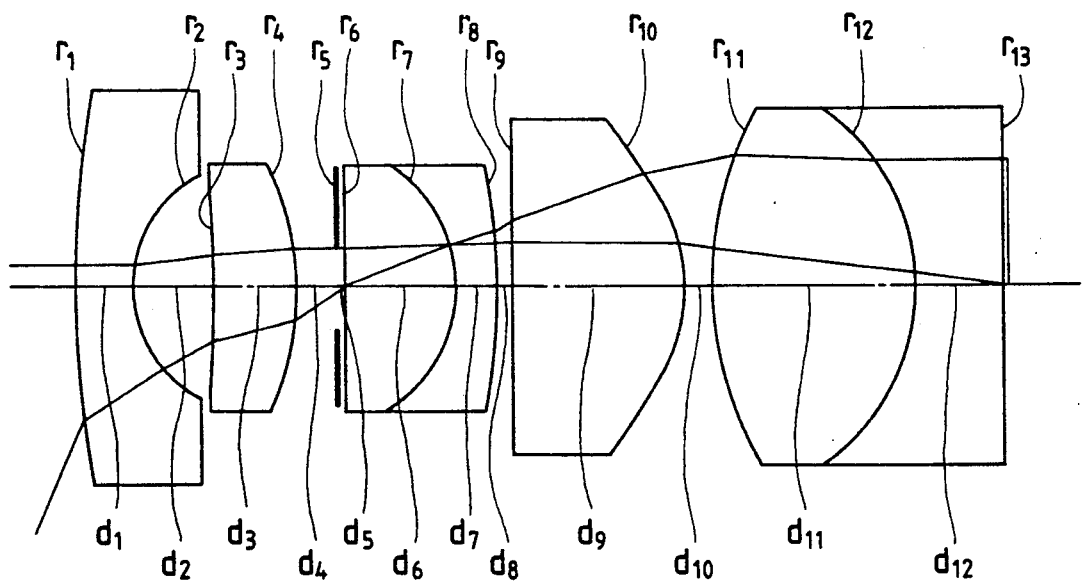
Figure 7:
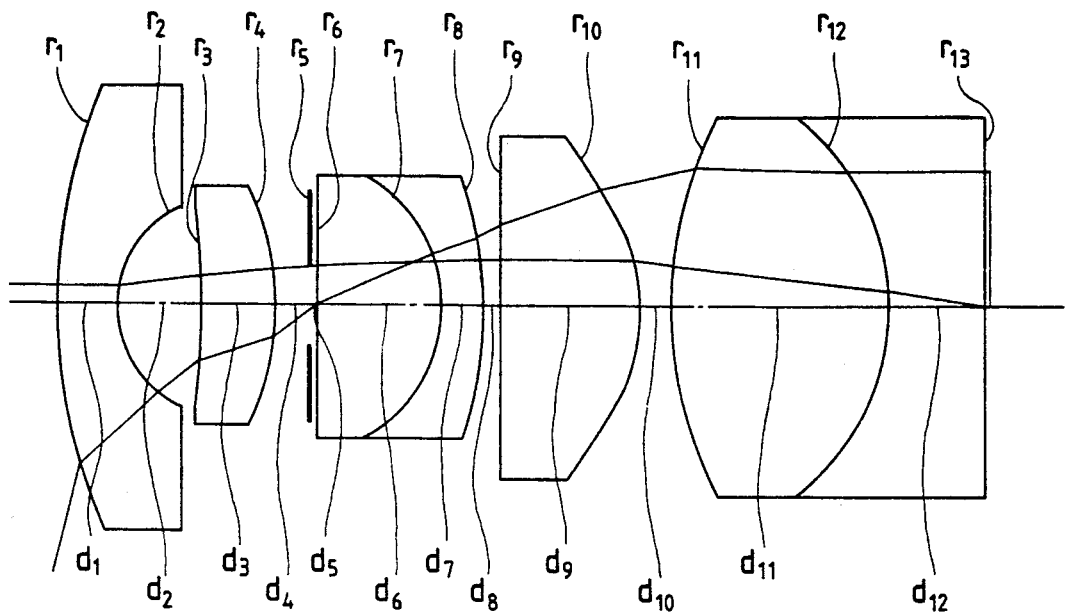
Figure 8:
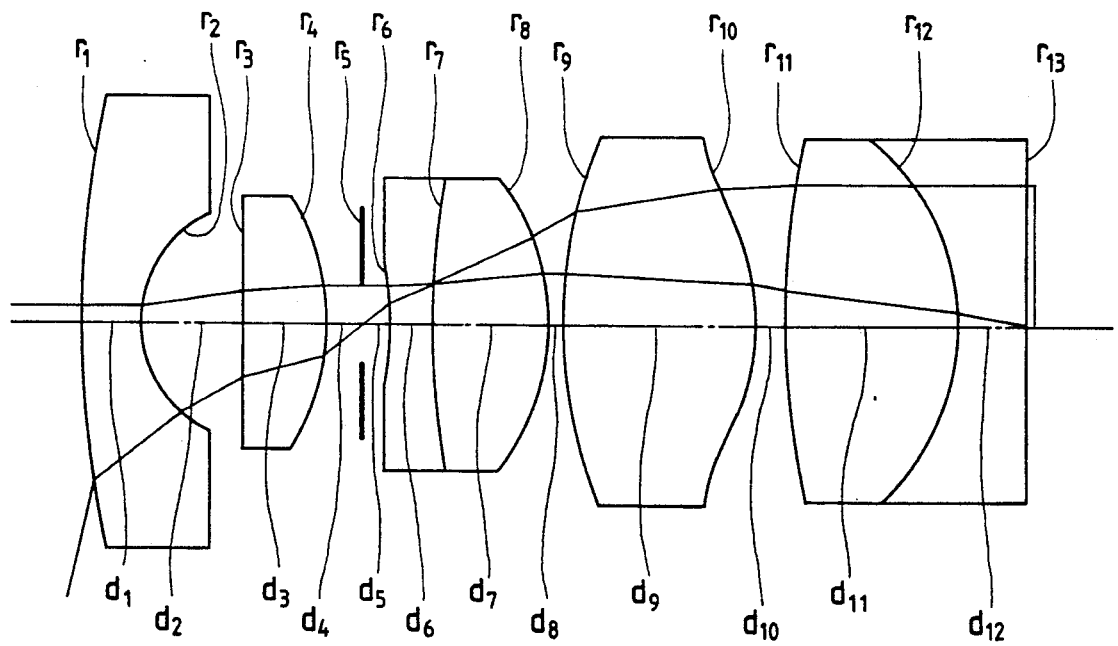

Now, the present invention will be described more detailedly below with reference to the preferred embodiments shown in the accompanying drawings and given in the form of the following numerical data:

Embodiment 1

| $f = 1.000$, $F/2.120$, $2\omega = 120°$ | | | |
|---|---|---|---|
| $IH = 1.1787$, Object distance $= -15.0000$ | | | |
| Paraxial magnification $\beta_E = -2.444$ | | | |
| $r_1 = \infty$ | | | |
| | $d_1 = 0.5797$ | $n_1 = 1.51633$ | $v_1 = 64.15$ |
| $r_2 = \infty$ (stop) | | | |
| | $d_2 = 0.9697$ | $n_2 = 1.72916$ | $v_2 = 54.68$ |
| $r_3 = -1.4844$ | | | |
| | $d_3 = 0.1932$ | | |
| $r_4 = \infty$ | | | |
| | $d_4 = 1.0771$ | $n_3 = 1.56384$ | $v_3 = 60.69$ |
| $r_5 = -0.7176$ (aspherical surface) | | | |
| | $d_5 = 0.1932$ | | |
| $r_6 = 3.1282$ | | | |
| | $d_6 = 0.6803$ | $n_4 = 1.51633$ | $v_4 = 64.15$ |
| $r_7 = \infty$ | | | |

Aspherical coefficient
$P = -0.8791$,
$E_f(n_{1-1} - n_i) f^3 = 0.358$
$hm/r_s = 0.630$, $hc/I = 0.823$
$\omega[rad] = 1.047$, $0.9\tan(\omega/0.9) = 2.086$
$I/f = 1.179$, Average refractive index $= 1.603$

Embodiment 2

$f = 1.000$, $F/2.341$, $2\omega = 120°$
$IH = 1.1650$, Object distance $= -15.0000$
$\beta_E = -10.065$

| | | | |
|---|---|---|---|
| $r_1 = 2.3920$ | | | |
| | $d_1 = 0.6460$ | $n_1 = 1.51633$ | $\nu_1 = 64.15$ |
| $r_2 = 0.7383$ | | | |
| | $d_2 = 0.7383$ | | |
| $r_3 = \infty$ (stop) | | | |
| | $d_3 = 0.8490$ | $n_2 = 1.72916$ | $\nu_2 = 54.68$ |
| $r_4 = -1.1111$ | | | |
| | $d_4 = 0.1846$ | | |
| $r_5 = \infty$ | | | |
| | $d_5 = 1.4950$ | $n_3 = 1.56384$ | $\nu_3 = 60.69$ |
| $r_6 = -1.4765$ (aspherical surface) | | | |
| | $d_6 = 0.1846$ | | |
| $r_7 = 2.9992$ | | | |
| | $d_7 = 1.2366$ | $n_4 = 1.72916$ | $\nu_4 = 54.68$ |
| $r_8 = \infty$ | | | |

Aspherical coefficient
$P = -4.7000$,
$E_i(n_{i-1} - n_i) f^3 = 0.125$
$hm/r_s = 0.704$, $hc/I = 0.829$
$\omega[rad] = 1.047$, $0.9\tan(\omega/0.9) = 2.086$
$I/f = 1.165$, Average refractive index $= 1.635$
$f(n_{i-1} - n_i)/r_i' = 0.382$

Embodiment 3

$f = 1.000$, $F/2.311$, $2\omega = 140°$
$IH = 1.2400$, Object distance $= -15.0000$
$\beta_E = -139.742$

| | | | |
|---|---|---|---|
| $r_1 = 2.6385$ | | | |
| | $d_1 = 0.7126$ | $n_1 = 1.51633$ | $\nu_1 = 64.15$ |
| $r_2 = 0.8144$ | | | |
| | $d_2 = 0.5293$ | | |
| $r_3 = \infty$ (stop) | | | |
| | $d_3 = 0.9365$ | $n_2 = 1.72916$ | $\nu_2 = 54.68$ |
| $r_4 = -1.0851$ | | | |
| | $d_4 = 0.2036$ | | |
| $r_5 = \infty$ | | | |
| | $d_5 = 0.9569$ | $n_3 = 1.56384$ | $\nu_3 = 60.69$ |
| $r_6 = -1.6287$ (asphercal surface) | | | |
| | $d_6 = 0.2036$ | | |
| $r_7 = 2.9358$ | | | |
| | $d_7 = 1.3838$ | $n_4 = 1.72916$ | $\nu_4 = 54.68$ |
| $r_8 = \infty$ | | | |

Aspherical coefficient
$P = -4.7000$,
$E_i(n_{i-1} - n_i) f^3 = 0.093$
$hm/r_s = 0.842$, $hc/I = 0.788$
$\omega[rad] = 1.222$, $0.9\tan(\omega/0.9) = 4.155$
$I/f = 1.240$, Average refractive index $= 1.635$
$f(n_{i-1} - n_i)/r_i' = 0.346$

Embodiment 4

$f = 1.000$, $F/2.364$, $2\omega = 120°$
$IH = 1.2837$, Object distnace $= -15.0000$
$\beta_E = -3.925$

| | | | |
|---|---|---|---|
| $r_1 = 3.3290$ | | | |
| | $d_1 = 0.6733$ | $n_1 = 1.51633$ | $\nu_1 = 64.15$ |
| $r_2 = 0.6504$ | | | |
| | $d_2 = 0.8314$ | | |
| $r_3 = 23.3180$ (stop) | | | |
| | $d_3 = 0.8938$ | $n_2 = 1.72916$ | $\nu_2 = 54.68$ |
| $r_4 = -1.2384$ | | | |
| | $d_4 = 0.4879$ | | |
| $r_5 = -26.3472$ | | | |
| | $d_5 = 1.8788$ | $n_3 = 1.56384$ | $\nu_3 = 60.69$ |
| $r_6 = -1.977$ (aspherical surface) | | | |
| | $d_6 = 0.2165$ | | |
| $r_7 = 4.6120$ | | | |
| | $d_7 = 1.4349$ | $n_4 = 1.72916$ | $\nu_4 = 54.68$ |
| $r_8 = \infty$ | | | |

Aspherical coefficient
$P = -0.9042$, $B = 0$, $E = 0.11599 \times 10^{-1}$
$F = 0.94886 \times 10^{-2}$, $G = 0.23421 \times 10^{-2}$
$E_i(n_{i-1} - n_i) f^3 = 0.085$
$hm/r_s = 0.700$, $hc/I = 0.861$
$\omega[rad] = 1.047$, $0.9\tan(\omega/0.9) = 2.086$
$I/f = 1.284$, Average refractive index $= 1.635$
$f(n_{i-1} - n_i)/r_i' = 0.471$

Embodiment 5

$f = 1.000$, $F/2.354$, $2\omega = 120°$
$IH = 1.1589$, Object distance $= -15.0000$
$\beta_E = -6.150$

| | | | |
|---|---|---|---|
| $r_1 = 2.6205$ | | | |
| | $d_1 = 0.6649$ | $n_1 = 1.51633$ | $\nu_1 = 64.15$ |
| $r_2 = 0.7599$ | | | |
| | $d_2 = 0.7599$ | | |
| $r_3 = -7.2793$ (stop) | | | |
| | $d_3 = 0.9670$ | $n_2 = 1.72916$ | $\nu_2 = 54.68$ |
| $r_4 = -1.1351$ | | | |
| | $d_4 = 0.1900$ | | |
| $r_5 = 7.3799$ | | | |
| | $d_5 = 1.8920$ | $n_3 = 1.72916$ | $\nu_3 = 54.68$ |
| $r_6 = -3.9718$ | | | |
| | $d_6 = 0.1900$ | | |
| $r_7 = 1.4480$ (aspherical surface) | | | |
| | $d_7 = 1.1522$ | $n_4 = 1.56384$ | $\nu_4 = 60.69$ |
| $r_8 = \infty$ | | | |

Aspherical coefficient
$P = -5.2256$,
$E_i(n_{i-1} - n_i) f^3 = 0.145$
$hm/r_s = 0.552$, $hc/I = 1.000$
$\omega[rad] = 1.047$, $0.9\tan(\omega/0.9) = 2.086$
$I/f = 1.159$, Average refractive index $= 1.635$
$f(n_{i-1} - n_i)/r_i' = 0.389$

Embodiment 6

$f = 1.000$, $F/2.230$, $2\omega = 132.8°$
$IH = 1.2587$, Object distance $= -13.9860$
$\beta_E = -12.540$

| | | | |
|---|---|---|---|
| $r_1 = 11.8881$ | | | |
| | $d_1 = 0.5594$ | $n_1 = 1.88300$ | $\nu_1 = 40.78$ |
| $r_2 = 1.2769$ | | | |
| | $d_2 = 0.7832$ | | |
| $r_3 = -16.4783$ | | | |
| | $d_3 = 0.8392$ | $n_2 = 1.83350$ | $\nu_2 = 21.00$ |
| $r_4 = -2.5762$ | | | |
| | $d_4 = 0.4336$ | | |
| $r_5 = \infty$ (Stop) | | | |
| | $d_5 = 0.0420$ | | |
| $r_6 = \infty$ | | | |
| | $d_6 = 1.1469$ | $n_3 = 1.72916$ | $\nu_3 = 54.68$ |
| $r_7 = -1.4238$ | | | |
| | $d_7 = 0.4196$ | $n_4 = 1.83350$ | $\nu_4 = 21.00$ |
| $r_8 = -5.1105$ | | | |
| | $d_8 = 0.1399$ | | |
| $r_9 = \infty$ | | | |
| | $d_9 = 1.7762$ | $n_5 = 1.56384$ | $\nu_5 = 60.69$ |

-continued
$f(n_{i-1} - n_i)/r_i' = 0.786$

-continued $r_{10} = -1.5832$
(Aspherical surface)
$\quad d_{10} = 0.2797$
$r_{11} = 4.0643$
$\quad d_{11} = 1.9580 \quad n_6 = 1.72916 \quad \nu_6 = 54.68$
$r_{12} = -2.2727$
$\quad d_{12} = 0.9091 \quad n_7 = 1.83350 \quad \nu_7 = 21.00$
$r_{13} = \infty$ Aspherical coefficient
$P = 0.1170, B = 0, E = -0.55925 \times 10^{-2}$
$F = 0.14314 \times 10^{-1}, G = -0.21685 \times 10^{-2}$
$E_i(n_{i-1} - n_i) \cdot f^3 = 0.0125$
$hm/r_s = 1.081, hc/I = 0.909$
$\omega[\text{rad}] = 1.159, 0.9\tan(\omega/0.9) = 3.098$
$I/f = 1.259$, Average refractive index $= 1.772$
$f(n_{i-1} - n_i)/r_i' = 0.356$

Embodiment 7

$f = 1.000, F/2.268, 2\omega = 153.1°$
$IH = 1.4308$, Object distance $= -12.7186$
$\beta_E = -23.861$ $r_1 = 6.1304$
$\quad d_1 = 0.6359 \quad n_1 = 1.88300 \quad \nu_1 = 40.78$
$r_2 = 1.1526$
$\quad d_2 = 0.8744$
$r_3 = -7.8935$
$\quad d_3 = 0.7631 \quad n_2 = 1.83350 \quad \nu_2 = 21.00$
$r_4 = -2.9285$
$\quad d_4 = 0.3816$
$r_5 = \infty$ (Stop)
$\quad d_5 = 0.0477$
$r_6 = \infty$
$\quad d_6 = 1.3355 \quad n_3 = 1.72916 \quad \nu_3 = 54.68$
$r_7 = -1.5517$
$\quad d_7 = 0.4769 \quad n_4 = 1.83350 \quad \nu_4 = 21.00$
$r_8 = -4.1860$
$\quad d_8 = 0.1590$
$r_9 = \infty$
$\quad d_9 = 1.5103 \quad n_5 = 1.56384 \quad \nu_5 = 60.69$
$r_{10} = -1.8219$
(Aspherical surface)
$\quad d_{10} = 0.3180$
$r_{11} = 4.2353$
$\quad d_{11} = 2.2258 \quad n_6 = 1.72916 \quad \nu_6 = 54.68$
$r_{12} = -2.5835$
$\quad d_{12} = 1.0334 \quad n_7 = 1.83350 \quad \nu_7 = 21.00$
$r_{13} = \infty$ Aspherical coefficient
$P = -0.0224, B = 0, E = -0.21875 \times 10^{-2}$
$F = 0.36823 \times 10^{-2}, G = -0.48693 \times 10^{-4}$
$E_i(n_{i-1} - n_i) f^3 = 0.0107$
$hm/r_s = 1.182, hc/I = 0.888$
$\omega[\text{rad}] = 1.336, 0.9\tan(\omega/0.9) = 10.347$
$I/f = 1.431$, Average refractive index $= 1.772$
$f(n_{i-1} - n_i)/r_i' = 0.309$

Embodiment 8

$f = 1.000, F/2.271, 2\omega = 152.9°$
$IH = 1.4271$, Object distance $= -12.6857$
$\beta_E = -15.550$ $r_1 = 10.3436$
$\quad d_1 = 0.6343 \quad n_1 = 1.88300 \quad \nu_1 = 40.78$
$r_2 = 1.2606$
$\quad d_2 = 1.0307$
$r_3 = \infty$
$\quad d_3 = 0.8721 \quad n_2 = 1.83350 \quad \nu_2 = 21.00$
$r_4 = -2.6133$
$\quad d_4 = 0.3806$
$r_5 = \infty$(Stop)
$\quad d_5 = 0.3171$ $r_6 = -3.0192$
$\quad d_6 = 0.4599 \quad n_3 = 1.83350 \quad \nu_3 = 21.00$
$r_7 = 8.2901$
$\quad d_7 = 1.2527 \quad n_4 = 1.72916 \quad \nu_4 = 54.68$
$r_8 = -2.3516$
$\quad d_8 = 0.1586$
$r_9 = 4.8681$
$\quad d_9 = 2.0456 \quad n_5 = 1.56384 \quad \nu_5 = 60.69$
$r_{10} = -2.2238$
(Aspherical surface)
$\quad d_{10} = 0.3171$
$r_{11} = 10.2453$
$\quad d_{11} = 1.7919 \quad n_6 = 1.72916 \quad \nu_6 = 54.68$
$r_{12} = -2.5498$
$\quad d_{12} = 0.7170 \quad n_7 = 1.83350 \quad \nu_7 = 21.00$
$r_{13} = \infty$ Aspherical coefficient
$P = -1.0132, B = 0, E = 0.50514 \times 10^{-2}$
$F = 0.20009 \times 10^{-2}, G = 0.47710 \times 10^{-4}$
$E_i(n_{i-1} - n_i) \cdot f^3 = 0.0158$
$hm/r_s = 0.973, hc/I = 0.993$
$\omega[\text{rad}] = 1.334, 0.9\tan(\omega/0.9) = 10.167$
$I/f = 1.427$, Average refractive index $= 1.772$
$f(n_{i-1} - n_i)/r_i' = 0.254$

Embodiment 9

$f = 1.000, F/2.335, 2\omega = 116.0°$
$IH = 1.1359$, Object distance $= -14.8976$
$\beta_E = -8.173$ $r_1 = 3.6006$
$\quad d_1 = 0.6518 \quad n_1 = 1.51633 \quad \nu_1 = 64.15$
$r_2 = 0.7187$
$\quad d_2 = 0.6297$
$r_3 = -47.6071$ (Stop)
$\quad d_3 = 0.8922 \quad n_2 = 1.72916 \quad \nu_2 = 54.68$
$r_4 = -1.1611$
$\quad d_4 = 0.1862$
$r_5 = -16.4898$
$\quad d_5 = 1.6748 \quad n_3 = 1.56384 \quad \nu_3 = 60.69$
$r_6 = -1.4151$
(Aspherical surface)
$\quad d_6 = 0.1862$
$r_7 = 3.4415$
$\quad d_7 = 1.7049 \quad n_4 = 1.72916 \quad \nu_4 = 54.68$
$r_8 = \infty$ Aspherical coefficient
$P = -3.6578,$
$E_i(n_{i-1} - n_i) \cdot f^3 = 0.1158$
$hm/r_s = 0.874, hc/I = 0.847$
$\omega[\text{rad}] = 1.012, 0.9\tan(\omega/0.9) = 1.882$
$I/f = 1.136$, Average refractive index $= 1.635$
$f(n_{i-1} - n_i)/r_i' = 0.398$

Embodiment 10

$f = 1.000, F/2.406, 2\omega = 116.0°$
$IH = 1.1314$, Object distance $= -14.8382$
$\beta_E = -8.968$ $r_1 = 3.5972$
$\quad d_1 = 0.6492 \quad n_1 = 1.51633 \quad \nu_1 = 64.15$
$r_2 = 0.7478$
$\quad d_2 = 0.6180$
$r_3 = -18.2847$ (Stop)
$\quad d_3 = 0.8606 \quad n_2 = 1.72916 \quad \nu_2 = 54.68$
$r_4 = -1.1546$
$\quad d_4 = 0.1855$
$r_5 = -23.3371$
$\quad d_5 = 1.5212 \quad n_3 = 1.56384 \quad \nu_3 = 60.69$
$r_6 = -2.6919$
$\quad d_6 = 0.1855$
$r_7 = 1.7835$
(Aspherical surface)

-continued

|  | $d_7 = 1.7927$ | $n_4 = 1.72916$ | $\nu_4 = 54.68$ |
| --- | --- | --- | --- |
| $r_8 = \infty$ | | | |

Aspherical coefficient
  $P = -4.4223,$
  $E_i(n_{i-1} - n_i) f^3 = 0.0871$
  $hm/r_s = 0.799, \ hc/I = 1.000$
  $\omega[\text{rad}] = 1.012, \ 0.9\tan(\omega/0.9) = 1.882$
  $I/f = 1.131, \ \text{Average refractive index} = 1.635$
  $f(n_{i-1} - n_i)/r_i' = 0.409$ wherein the reference symbols $r_1, r_2, \ldots$ represent the radii of curvature on the surfaces of the respective lens components, the reference symbols $d_1, d_2, \ldots$ designate the thicknesses of the respective lens components and the airspaces reserved therebetween, the reference symbols $n_1, n_2, \ldots$ denote the refractive indices of the respective lens components, and the reference symbols $\nu_1, \nu_2, \ldots$ represent Abbe's numbers of the respective lens components.

The Embodiment 1 has the composition illustrated in FIG. 1 wherein the front lens unit arranged before the aperture stop has no power. Speaking more concretely, a plane parallel plate ($r_1, r_2$) is cemented to a positive lens component ($r_1, r_3$) with an aperture stop interposed therebetween. Further, the rear lens unit is composed of three positive lens components. The second lens component arranged in the rear lens unit has an image side surface which is designed as an aspherical surface. This aspherical surface serves for correcting distortion but does not cause curvature or undulation of the image surface which is often produced by aspherical surfaces. Further, this aspherical surface a smooth shape free from inflection point so that a molding die for manufacturing the lens component having this aspherical surface can easily be prepared. Distortion is corrected down to $-29\%$ at a half field angle of 60° of the Embodiment 1.

The Embodiments 2 through 5 have the compositions illustrated in FIG. 2 through FIG. 5 respectively, in each of which a retrofocus type lens system is composed by arranging a negative lens component in the front lens unit, and the rear lens unit is composed of three lens components.

In the Embodiment 2, 3 or 4, the image side surface of the second lens component arranged in the rear lens unit is designed as an aspherical surface. In the Embodiment 5, the third lens component arranged in the rear lens unit has an object side surface which is designed as an aspherical surface. The aspherical surfaces used in the Embodiments 2, 3 and 5 have no inflection point, whereas the aspherical surface adopted in the Embodiment 4 has an inflection point.

Distortion is $-32\%$ at a field angle of 60° in the Embodiment 2, $-54\%$ at a field angle of 70° in the Embodiment 3, $-24\%$ at a field angle of 60° in the Embodiment 4, and $-32\%$ at a field angle of 60° in the Embodiment 5.

In each of the Embodiments 6 through 8, the front lens unit comprises a positive lens component, and is composed, in the order from the object side, of a negative lens component having a strongly concave surface on the image side and a positive lens component having a strongly convex surface on the image side. Further, the rear lens unit consists, in the order from the side of the aperture stop, a positive lens component having a convex surface on the image side, a positive lens component having a convex aspherical surface on the image side and a lens component having a convex surface on the side of the aperture stop. In these Embodiments, cemented doublets are used in the rear lens units for correcting lateral chromatic aberration and the positive lens components arranged in the front lens units are made of highly dispersive glass materials having Abbe's numbers larger than 45 for correcting the lateral chromatic aberration. Furthermore, the negative lens components arranged on the most object side are made of glass materials having refractive indices higher than 1.7 so that the lens components can easily be manufactured in practice. Moreover, the positive lens components arranged right after the aperture stops are designed as cemented doublets for correcting longitudinal chromatic aberration.

In addition, the Embodiments 6 through 8 adopt the compositions wherein the imaging surfaces of CCD or the similar device can be cemented to the lens components to make invisible dust or foreign matters located at the image points, as well as the most object side surfaces which are nearly planar surfaces to obtain favorable water drop-off characteristics. In order to permit designing lens components which can easily be manufactured in practice and accommodated conveniently within limited spaces in the distal ends of endoscopes, the Embodiments 6 through 8 select glass materials having high refractive indices for most of the lens components, or an average refractive index (total sum of the refractive indices of the lens components/number of the lens components) higher than 1.65.

Further, the aspherical lens components used in the Embodiments 6 and 7 are designed a plano-convex lens components having surfaces which cannot be made eccentric by the press molding.

Figure 9:
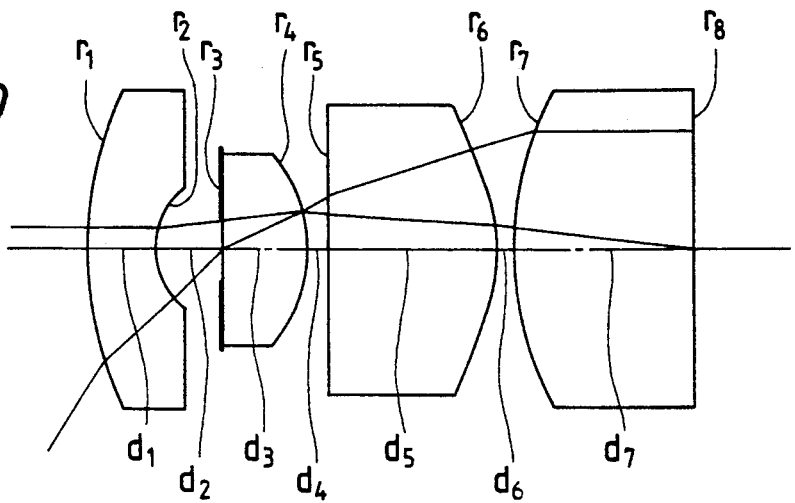
Figure 10:
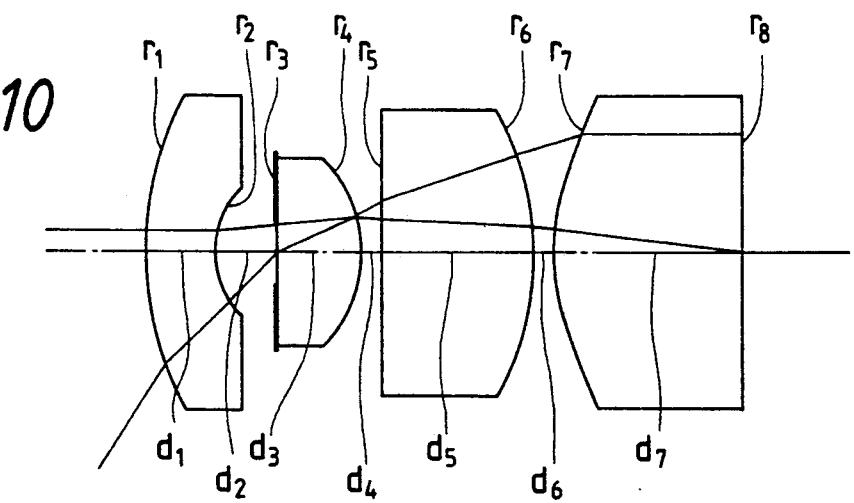
Figure 11:
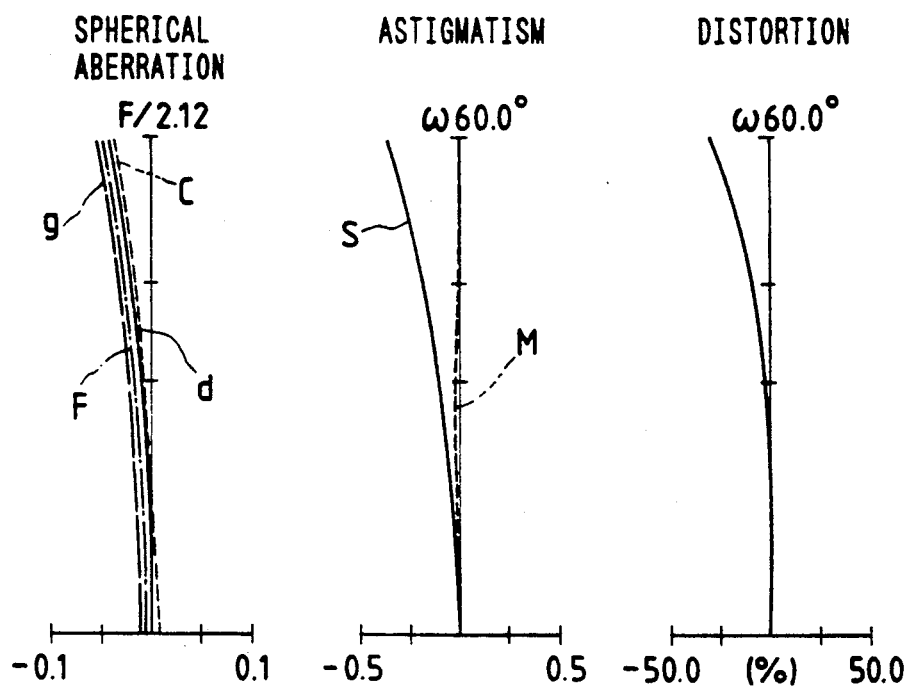
FIG. 11 through FIG. 20 show curves visualizing aberration characteristics of the Embodiments 1 through 10 respectively of the present invention.
Figure 12:
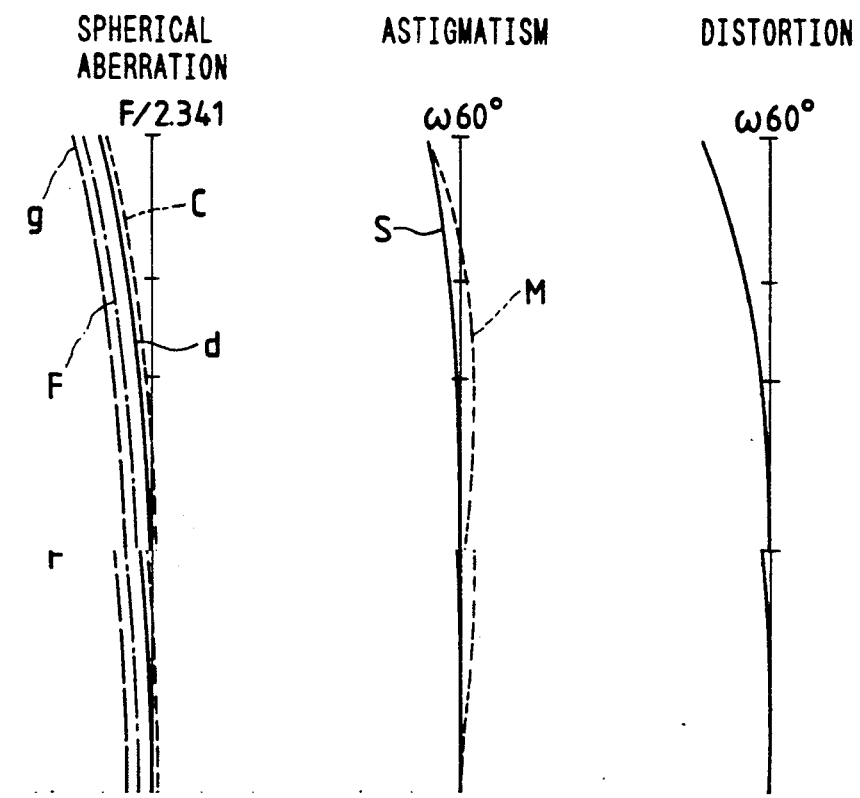
Figure 13:
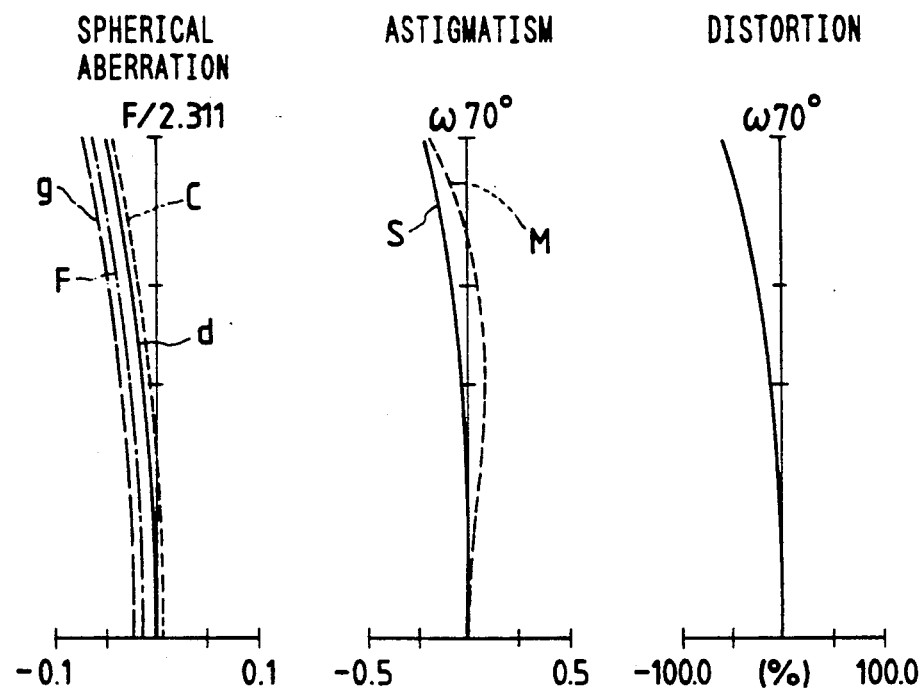
Figure 14:
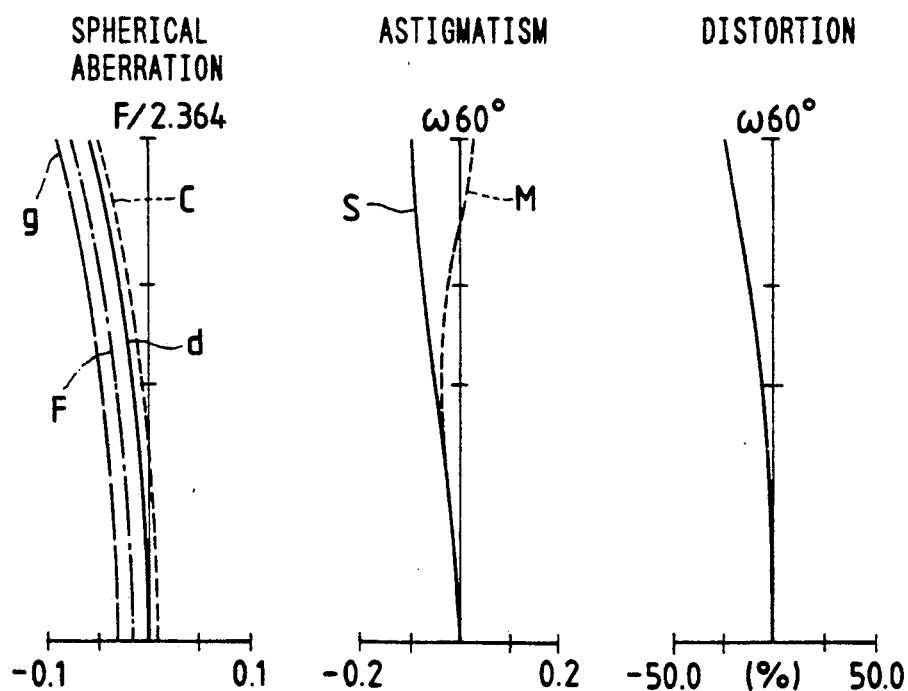
Figure 15:
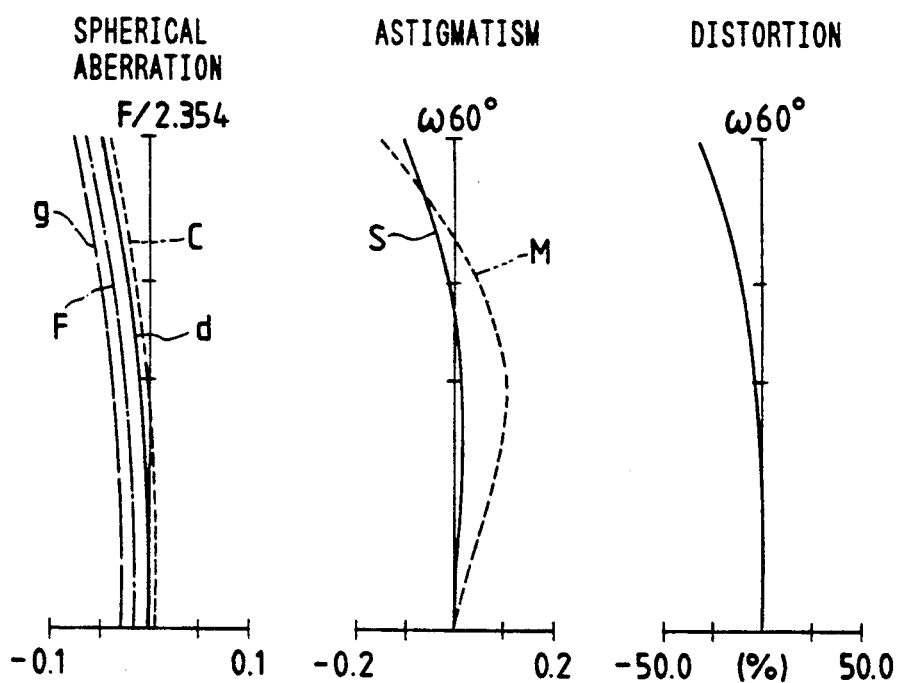
Figure 16:
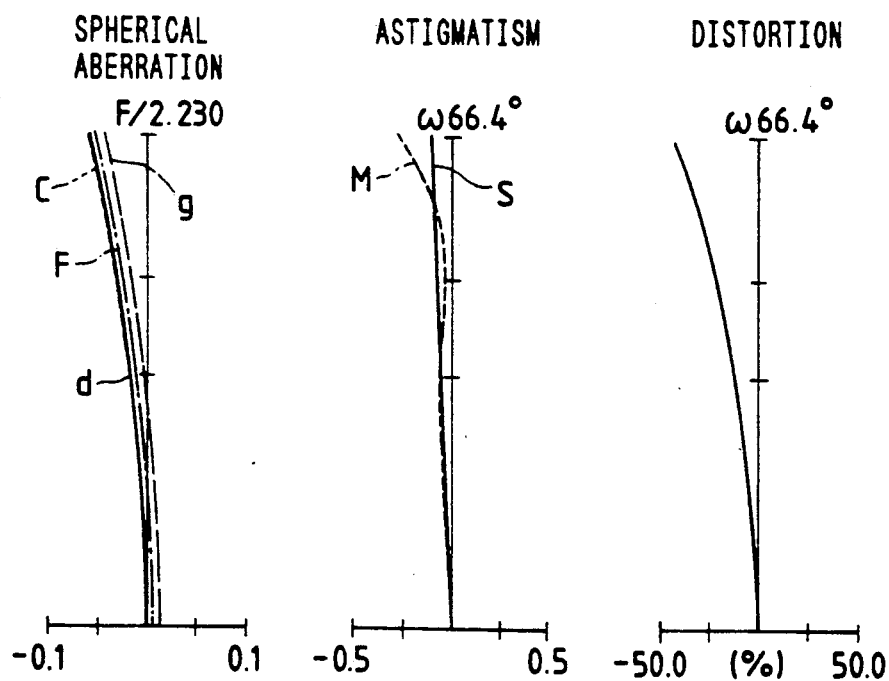
Figure 17:
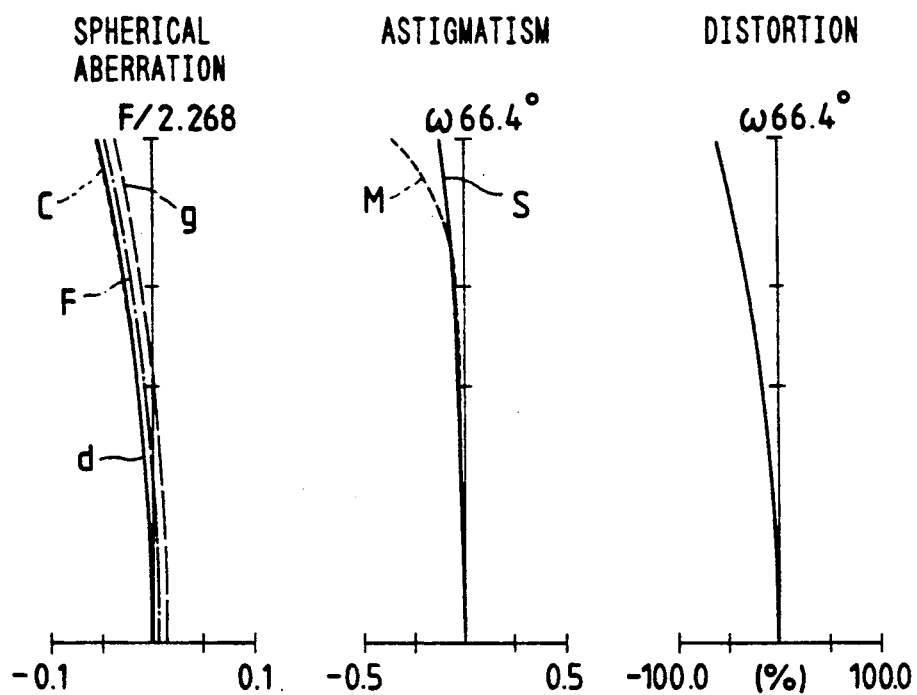
Figure 18:
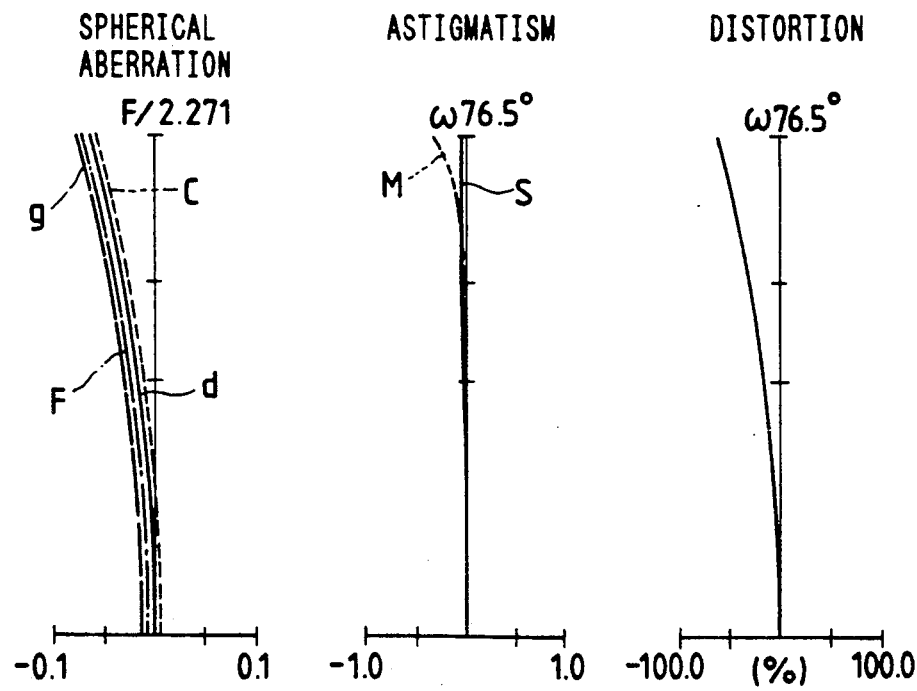
Figure 19:
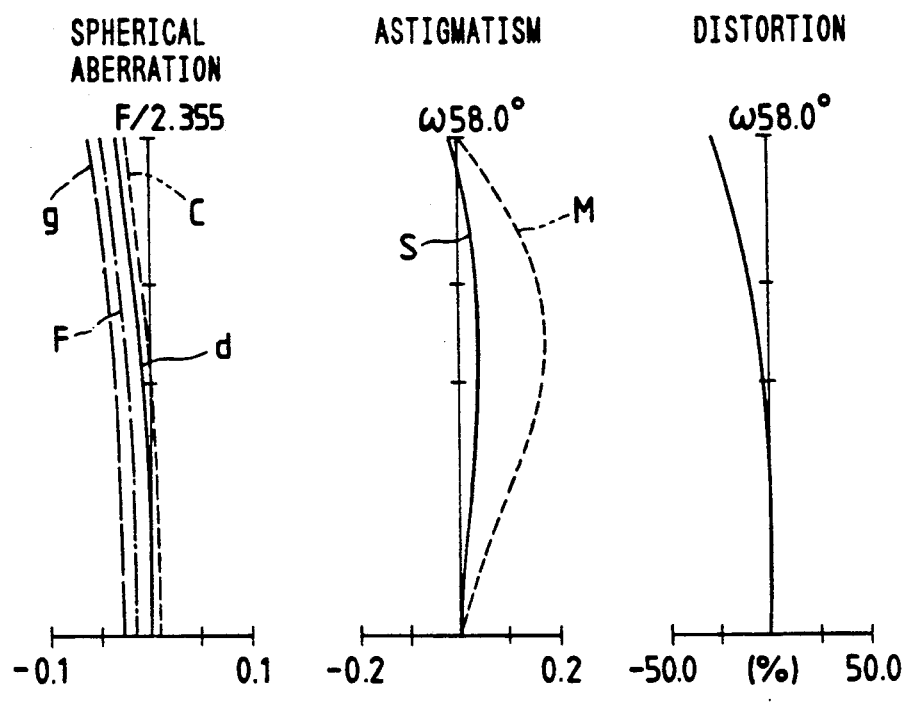
Figure 20:
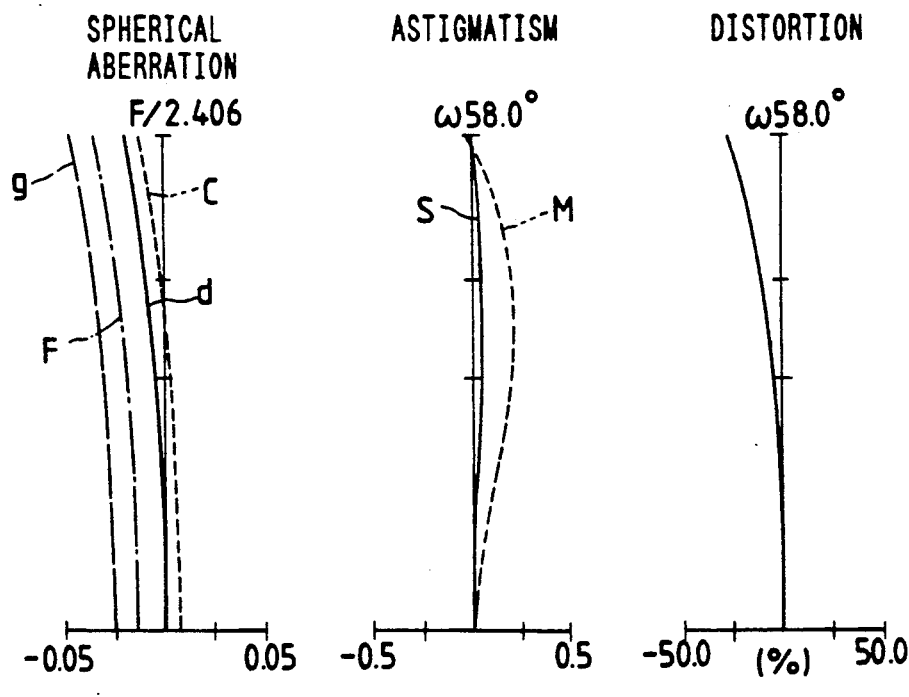

The Embodiments 9 and 10 have the compositions illustrated in FIG. 9 and FIG. 10 respectively, in each of which the front lens unit consists of a single negative lens component, and the rear lens unit is composed, in the order from the side of the aperture stop, of a positive lens component having a convex surface on the image side, a positive lens component having a convex surface on the image side and a positive lens component having a convex surface on the object side.

An aspherical surface is arranged on the image side of the lens component located at the middle position in the rear lens unit in the Embodiment 9, whereas an aspherical surface is used as the object side surface of the positive lens component arranged on the most image side in the rear lens unit in the Embodiment 10. In either of these Embodiments, the aspherical surface is located at an optimum position from the viewpoint of the heights of the marginal ray and the principal ray respectively.

As is understood from the foregoing description, the present invention adopts a composition permitting obtaining a nearly telecentric and compact objective lens system for endoscopes which has a favorable water drop-off characteristic and reduced distortion while correcting curvature of field without using an aspherical surface hardly manufacturable in practice.

I claim:

1. An objective lens system for endoscopes, comprising, in order from the object side:
  a front lens unit including a negative lens component and a positive lens component;
  an aperture stop; and
  a rear lens unit having a positive refractive power; wherein said aperture stop is disposed substantially at a front focal point of said rear lens unit; and at least said rear lens unit includes an aspherical surface satisfying the following condition (1):

$$E'(n_{i-1} - n_i) > 0 \qquad (1)$$

wherein the reference symbol E' represents the aspherical surface coefficient of fourth order, the reference symbol $n_{i-1}$ designates the refractive index of a medium disposed on the object side of said aspherical surface, and the reference symbol $n_i$ denotes the refractive index of the medium disposed on the image side of said aspherical surface.

2. An objective lens system for endoscopes according to claim 1 further satisfying the following condition (2):

$$\omega \leq I/f \leq 0.9 \tan(\omega/0.9) \qquad (2)$$

wherein the reference symbol $\omega$ represents the half field angle of said objective lens system, the reference symbol I designates the maximum image height and the reference symbol f denotes the focal length of the objective lens system as a whole.

3. An objective lens system for endoscopes comprising, in the order from the object side, a front lens unit comprising a negative lens component, an aperture stop and a rear lens unit having a positive refractive power:

said aperture stop being located substantially at the front focal point of said positive lens unit; and said rear lens unit comprising at least one aspherical surface at a location satisfying the following conditions (5) and (6):

$$|hm/r_s| > 0.5 \qquad (5)$$

$$|hc/I/51 > 0.5 \qquad (6)$$

wherein the reference symbol $h_m$ represents the height of the marginal ray on said aspherical surface, the reference symbol hc designates the height, on said aspherical surface, of the principal ray to attain to the maximum image height, the reference symbol $r_s$ denotes the radius of the aperture of said aperture stop, and the reference symbol I represents the maximum image height.

4. An objective lens system for endoscopes according to claim 3 wherein said aspherical surface satisfies the following condition (1):

$$E_i'(n_{i-1} - n_i) > 0 \qquad (1)$$

wherein the reference symbol $E_i'$ represents an aspherical surface coefficient of fourth order, the reference symbol $n_{i-1}$ designates the refractive index of a medium disposed on the object side of said aspherical surface, and the reference symbol $n_i$ denotes the refractive index of the medium disposed on the image side of said aspherical surface.

5. An objective lens system for endoscopes according to claim 3 wherein said front lens unit further comprises a positive lens component.

6. An objective lens system for endoscopes comprising, in order from the object side;

a front lens unit comprising a negative lens component;

an aperture stop; and a rear lens unit having a positive refractive power; wherein said aperture stop is disposed substantially at the front focal point of said rear lens unit; and at least said rear lens unit including an aspherical surface satisfying the following conditions (1) and (2):

$$E_i'(n_{i-1} - n_i) > 0 \qquad (1)$$

$$\omega \leq I/f \leq 0.9 \tan(\omega/0.9) \qquad (2)$$

wherein the reference symbol $E_i'$ represents an aspherical surface coefficient of fourth order, the reference symbol $n_{i-1}$ designates the refractive index of a medium disposed on the object side of said aspherical surface, the reference symbol $n_i$ denotes the refractive index of a medium disposed on the image side of said aspherical surface, the reference symbol $\omega$ represents a half field angle of said objective lens system, the reference symbol I designates maximum image height and reference symbol f denotes focal length of the objective lens system as a whole.

7. An objective lens system for endoscopes comprising, in order from the object side;

a front lens unit;

an aperture stop; and a rear lens unit having a positive refractive power; wherein:

said aperture stop is disposed substantially at the front focal point of said rear lens unit; and only said rear lens unit includes an aspherical surface satisfying the following conditions (1) and (2):

$$E_i'(n_{i-1} - n_i) > 0 \qquad (1)$$

$$\omega \leq I/f \leq 0.9 \tan(\omega/0.9) \qquad (2)$$

wherein the reference symbol $E_i'$ represents an aspherical surface coefficient of fourth order, the reference symbol $n_{i-1}$ designates the refractive index of a medium disposed on the object side of said aspherical surface, the reference symbol $n_i$ denotes the refractive index of a medium disposed on the image side of said aspherical surface, the symbol $\omega$ represents a half field angle of said objective lens system, the reference symbol I designates maximum image height and the reference symbol f denotes focal length of the objective lens system as a whole.

8. An objective lens system according to claim 2, 6 or 7 satisfying the following condition (3):

$$\Sigma E_i'(n_{i-1} - n_i) \cdot f^3 > 0.001 \qquad (3)$$

9. An objective lens system for endoscopes according to claim 2, 6 or 7 satisfying the following condition (4):

$$\Sigma E_i'(n_{i-1} - n_i) \cdot f_3 > 0.01 \qquad (4)$$

10. An objective lens system for endoscopes according to claim 2, 6 or 7 satisfying the following condition:

$$f(n_{i-1} - n_i)/r_i' \geq 0.1$$

Wherein the reference symbol $r_i'$ represents the radius of curvature of said aspherical surface as measured in the vicinity of the optical axis.

11. An objective lens system for endoscopes according to claim 2, 6 or 7 wherein the lens unit arranged after said aperture stop consists of three lens components having positive refractive powers.

12. An objective lens system for endoscopes according to claim 11 wherein the lens unit arranged after said aperture stop comprises a cemented doublet.

13. An objective lens system for endoscopes according to claim 2, 6 or 7 wherein an average value of the refractive indices of the lens components is larger than 1.65.

14. An objective lens system for endoscopes according to claim 2, 6 or 7 wherein the negative lens component and the positive lens component arranged in said front lens unit satisfy the following conditions:

$$n > 1.7$$

$$v > 45$$

wherein the reference symbol n represents the refractive index of said negative lens component and the reference symbol v designates the Abbe's number of said positive lens component.

* * * * *

UNITED STATES PATENT AND TRADEMARK OFFICE
CERTIFICATE OF CORRECTION

PATENT NO. : 5,119,238
DATED : June 2, 1992
INVENTOR(S) : IGARASHI

It is certified that error appears in the above-identified patent and that said Letters Patent is hereby corrected as shown below:

Col. 15, line 37, claim 3 should read:

$$|hc/I| > 0.5 \qquad (6)$$

Signed and Sealed this

First Day of March, 1994

BRUCE LEHMAN

*Attest:*

*Attesting Officer*            *Commissioner of Patents and Trademarks*